United States Patent [19]

Jividen et al.

[11] 3,803,660

[45] Apr. 16, 1974

[54] APPARATUS FOR CLEANING DISCS

[75] Inventors: Norman D. Jividen, Orange; Joseph M. Ludka, Palos Verdes Peninsula, both of Calif.

[73] Assignee: Randomex, Inc., Palos Verdes Peninsula, Calif.

[22] Filed: Apr. 27, 1972

[21] Appl. No.: 248,112

[52] U.S. Cl. .......... 15/21 C, 15/77

[51] Int. Cl. .......... A46b 13/04

[58] Field of Search ...... 15/21 C, 21 D, 21 R, 21 E, 15/29, 77, 97, 102, 181, 39

[56] References Cited

UNITED STATES PATENTS

| | | | |
|---|---|---|---|
| 2,801,431 | 8/1957 | Eastis | 15/29 |
| 2,843,869 | 7/1958 | Hermance | 15/181 X |
| 3,077,622 | 2/1963 | Murphy | 15/77 X |
| 3,664,872 | 5/1972 | Frank et al. | 134/6 |

*Primary Examiner*—Edward L. Roberts
*Attorney, Agent, or Firm*—M. John Carson, Esq.; Lewis M. Dalgarn, Esq.

[57] ABSTRACT

A T-shaped brush assembly, having a plurality of brush arms arranged in three banks, rotates adjacent to a rotating disc pack so that the brushes on the end of each brush arm pass between and bear against the recording surfaces of the corresponding adjacent discs of the disc pack. Filtered cleaning solution is sprayed against each of the brushes to clean the brushes of contaminants removed from the discs before the brushes contact the discs.

9 Claims, 6 Drawing Figures

APPARATUS FOR CLEANING DISCS

BACKGROUND OF THE INVENTION

The invention concerns disc pack cleaners and, more specifically, an apparatus for cleaning the surfaces of computer memory discs arranged in a disc pack.

A disc pack comprises a plurality of flat circular discs mounted in parallel spaced relation to each other on a central supporting member. Information is magnetically recorded on one or both sides of such discs for non-destructive and repeated retrieval at some future date. During the course of continued use, these discs accumulate contaminants on their surfaces, such as particles of dust mixed with oil or grease, which are not easily wiped off or blown away. Many computer facilities employing disc packs have used brushes, such as those used by applicants, to wipe across the discs and remove the loose dust lying on the disc surfaces. However, this method does not remove the contaminants which are more firmly attached to the disc surfaces. Such contaminants cause errors in the use of the disc packs and must therefore be removed with a solvent or some other type of cleaner.

Various means for cleaning the discs of the disc packs have been employed. These range from manually wiping an alcohol saturated nylon swab or pad across the surfaces of each disc to various machine facilitated methods. One of the latter type of devices employs a plastic comb with a nylon fabric threaded around each comb finger. The nylon fabric is then cut between the comb fingers to form a loose pad around each finger. The pads are presoaked with alcohol. The discs of the disc pack rotate between and are wiped by the pads and the entire comb assembly is replaced at the end of each cleaning operation. Such a device however merely smears or relocates the contaminants on the disc pack surfaces since the pads are not cleaned after every disc pack revolution. Also, insufficient pressure is applied to the disc surfaces to really scrub the discs and this method is expensive since a new comb assembly is employed each time another disc pack is to be cleaned.

Another disc pack cleaning apparatus employs separate cleaning and drying assemblies. A pad is secured to the end of each of the two finger assemblies. The two assemblies are mounted on opposite sides of the pack and the cleaning set of pads is manually soaked with alcohol. The discs of the disc pack are then rotated between adjacent sets of pads of the respective assemblies. After a period of time, the cleaning pads are moved away from the disc pack surfaces while the drying pads continue to wipe the discs. The pads may be reused for cleaning up to five disc packs before replacement. However, again the contaminants are merely relocated since the pads are not cleaned, the discs are not scrubbed, and the process is relatively expensive.

A third type of disc pack cleaning apparatus employs two banks of fingers rotated about a common shaft. A nylon foam pad is secured to the end of each finger and is followed by a rubber wiper or squeegee. The two banks of pads and squeegees slowly rotate in a vertical plane down through a bath of detergent cleaning solution, up out of the cleaning solution, across the disc surfaces, and down into the cleaning solution again. The pads wet the discs as they wipe across the disc surfaces and the following squeegees wipe off the excess cleaning solution. An agitator floats contaminants to the surface of the cleaning solution bath so that they flow from the bath over a spill-way and into a filter system. However, the point at which the contaminants flow over the spill-way is also the point at which the pads leave the cleaning solution. Contaminants floating on the surface of the cleaning solution are therefore picked up by the pads as they come out of the bath and are redeposited onto the discs. Furthermore, contaminants are not dislodged from the porous pads unless they are so loosely imbedded in the pads that they fall off upon immersion in the cleaning solution. In other words, contaminants are carried from the disc pack, through the solution, and back onto the disc pack again. Therefore, the pads must be replaced periodically as they become contaminated. Furthermore, the pads do not really scrub the discs. Such a process is expensive and ineffectual.

The present invention overcomes the defects of the prior art by providing a self-purging system which removes contaminants from non-porous cleaning brushes by directing jets of filtered cleaning solution against the brushes. Therefore, the brushes do not redeposit contaminants onto the discs and the brushes need not be constantly replaced. Furthermore, the apparatus of applicants' invention provides enough pressure against the disc surfaces to scrub the discs thereby dislodging contaminants which other methods fail to remove.

SUMMARY OF THE INVENTION

Brushes are employed to clean contaminants from the surfaces of a disc pack. The contaminants are cleaned from the brushes by spraying a fluid against the brushes.

In one embodiment of the invention, brushes are mounted at the trailing edge of the end of each brush arm of the T-shaped brush assembly where three banks of spaced brush arms form the three legs of the "T." A portion of the bristles of adjacent brushes are angled towards each other so that the brushes bear against the discs passing between adjacent brush arms. A spray bar having a plurality of apertures cleans contaminants from the brushes by spraying filtered cleaning solution between the brush arms against each brush so that each brush is sprayed twice during each revolution of the brush assembly, once as the brushes leave the disc pack and once just before they contact the disc pack. The disc pack and the brush assembly are rotated at an angle of about 45° to the vertical so that sprayed cleaning solution flows from the discs to be collected in a reservoir. The collected cleaning solution is filtered before it is again sprayed against the brushes.

DESCRIPTION OF THE DRAWING

The foregoing and other features of the invention will be understood by reference to the following descriptions taken in connection with the accompanying drawings wherein.

The disc pack cleaner of the best embodiment of the invention comprises three systems: a mechanical system, a fluid system and an electrical system.

MECHANICAL SYSTEM

The mechanical system consists of four main elements — a disc pack spindle, a brush assembly shaft, a brush assembly, and a cleaning fluid spray bar, all enclosed or mounted in a housing.

Figures 1, 2, 4:
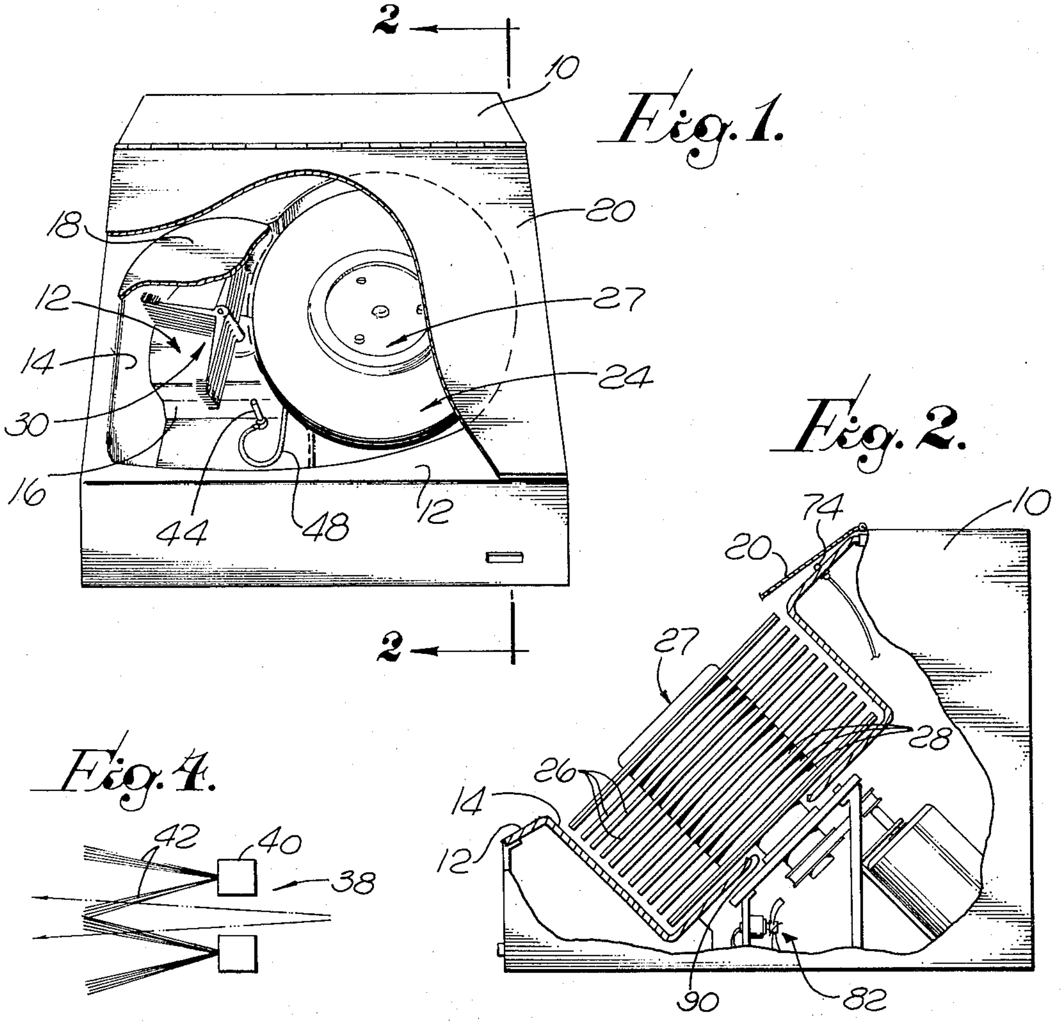
FIG. 1 is a partly broken away, perspective view of one embodiment of the invention.
FIG. 2 is an elevational side view taken along the line 2—2 of FIG. 1.
FIG. 4 is a partial cross sectional view of the brushes taken along the line 4—4 of FIG. 3.

With reference to FIGS. 1 and 2, a housing 10 formed of non-corrosive material, such as plastic or the like, is divided by a partition wall 12 to form a recess 14 and a reservoir 16 within the housing. The disc pack and brush assembly are mounted on the partition wall 12 in recess 14 and sprayed cleaning solution is collected in the reservoir 16. Beneath the partition wall 12 are secured the electrical and fluid components of the disc pack cleaner. A kidney-shaped shroud 18 fits against the shoulders of the partition wall 12 above the recess 14 and reservoir 16. The shroud 18 partially covers the brush assembly in order to contain the cleaning solution sprayed against the brushes, as will be explained hereinafter. A housing door or cover 20 closes the front of the housing 10 when the disc pack cleaner is in operation. The partition wall 12, recess 14, reservoir 16 and all of the mechanical components mounted within the recess and reservoir are at an angle of 45° to the vertical in order that cleaning solution will flow freely from the disc surfaces and into the reservoir 16.

A disc pack mounting spindle 22 protrudes from the floor of the partition wall 12 in the right hand portion of the recess 14 as shown in FIG. 1. Disc pack 24 has a plurality of individual circular discs 26 mounted in spaced parallel relation to each other on a common central tubular support member 27 formed by a plurality of spacers 28 fastened together and having concentric central apertures. The disc support member 27 slidably receives the spindle 22 and is secured to the spindle 22 by an internal male lock (not shown) or the like for rotation with the spindle 22.

Figure 3:
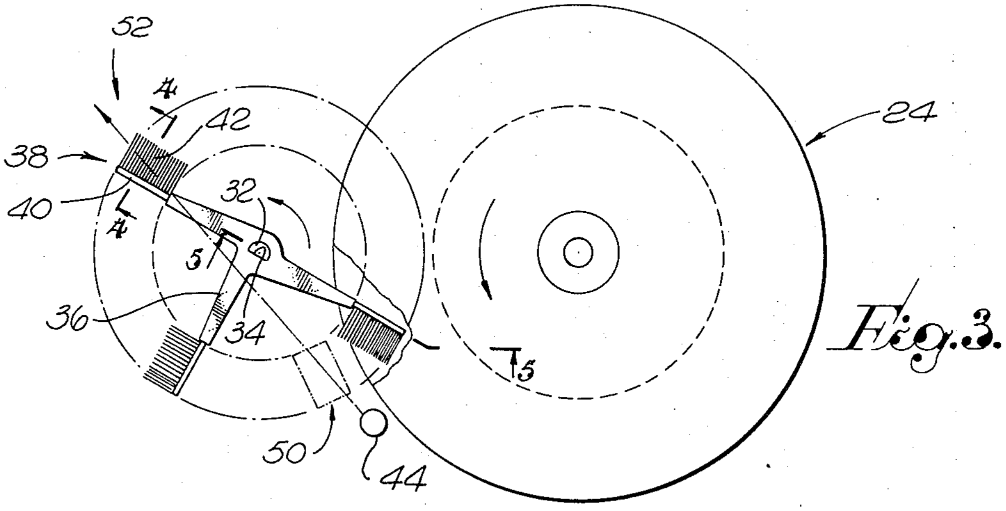
FIG. 3 is a schematic representation of various of the elements of FIG. 1.
Figure 5:
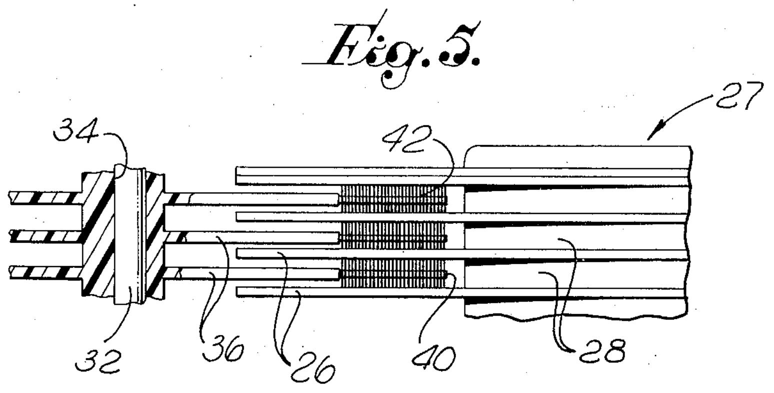
FIG. 5 is a partial cross sectional view of the interrelationship of the discs and brushes of the embodiment of the invention of FIGS. 1–4.

A T-shaped brush assembly 30 is mounted for rotation on a rotatable brush assembly spindle or shaft 32 which protrudes from the floor of the partition wall 12 in the left hand portion of the recess 14 as shown in FIG. 1. The shaft 32 and the spindle 22 are composed of stainless steel or the like. Referring also to FIGS. 3–5, the brush assembly 30 includes three banks of brush arms oriented to extend outward at about 90° from each other so that all three can be rotated to a position away from the discs as shown in FIG. 1 to allow unimpaired changing of disc packs. The brush assembly 30 is an integral unit formed of molded plastic or the like and has a central bore 34 adapted to receive the shaft 32. The shaft 32 and bore 34 are keyed together for rotation of the brush assembly 30 with the shaft 32.

Each bank of brush arms includes a plurality of individual brush arms 36 spaced in parallel relationship one above the other. A brush 38 is secured to the end of each brush arm. Each brush 38 includes a rectangular base 40 with an inner handle end secured inside of the hollow end of a respective brush arm by means of glue, a screw, or the like, and a plurality of bristles 42 fastened to one side of the base 40 by glue or the like. The bristles 42 are composed of nylon or the like which will not deteriorate in the cleaning solution. The bristles 42 of each brush 38 are in the form of a "V" with the apex of the "V" secured to the trailing edge of the brush base 40 so that the bristles flair outwardly and bear against or overlap bristles of adjacent brushes to form a second "V". This configuration provides a type of bias so that pressure is applied to both sides of the discs by the bristles as the discs are rotated between the adjacent brushes 38, as will be explained hereafter.

A spray bar 44 (FIGS. 1 and 6), having a line of apertures 46 spaced in a straight line longitudinal along one side of the spray bar, is mounted adjacent to but out of the area of rotation of the brush assembly 30. The spray bar 44 is a hollow tube closed at the top, connected to a supply tube 48 at the bottom, and composed of a material which will not deteriorate in the cleaning solution, such as brass or the like. The spray bar apertures 46 decrease in size towards the top of the bar 44 in order that the cleaning fluid entering under pressure at the bottom of the bar 44 through supply tube 48 will be sprayed with sufficient force out of the top spray bar aperture.

As is shown in FIGS. 1, 3 and 5, the disc pack 24 and the brush assembly 30 are mounted adjacent to each other so that the individual brushes 38 pass between adjacent pairs of discs 26 and wipe across adjacent surfaces of the disc pairs in an arc extending across the entire recording surface of the discs.

In one embodiment of the invention, as is shown in FIGS. 1 and 2, the disc pack 24 has eleven individual discs 26. Each disc, except the end discs, has information recorded on both sides and each end disc has information recorded on only the inside surface. Ten brush arms 36 are provided in each of the three banks of the brush assembly 30 so that one brush arm in each of the three banks passes between adjacent pairs of discs where information may be recorded. The brush assembly and the disc pack are both rotated in the same direction, in this case both in the counterclockwise direction, so that the brushes 42 wipe across the disc surfaces in a direction opposite to the rotation of the discs. Thus, each disc surface is wiped with one brush from each of the three banks of brush arms as the disc pack and the brush assembly are rotated.

In a typical embodiment of the invention, the axis of rotation of the brush assembly shaft is located about 8-½ inches from the axis of rotation of the disc pack spindle, each brush arm and brush handle is a total of about 5 inches in length, and the disc pack is about 14 inches in diameter with the inner edge of the recording surfaces terminating about 2-¾ inches from the outer periphery of each disc. Therefore, the brush arms extend about three-fourths of an inch beyond the recording surfaces when the brush arms are aligned between the shaft 32 and the spindle 22. The discs are spaced about 0.4 inch apart and therefore the brush arms are also spaced about 0.4 inch apart. The brush bristles 42 are about three-fourths of an inch long and are angled about 15° from the center line of the respective brush arm, as is shown in FIG. 4. With such a configuration, scrubbing pressure is applied to the disc surfaces by the bristles, as is shown in FIG. 5, so that the more firmly embedded contaminants will be dislodged and removed from the disc surfaces.

The T-shaped brush arm assembly 30 is initially positioned as is shown in FIG. 1 with all three banks of arms positioned so that a disc pack can be easily inserted or removed. As is shown in FIGS. 3 and 4, the spray bar 44 is positioned so that jets of cleaning fluid are sprayed between adjacent brush arms 36 and against each set of bristles 42 twice between the time the respective brush 38 leaves the discs and the time it again contacts the discs. When the cleaning operation begins, the brushes nearest to the disc pack are first wetted at position 50 before they are rotated onto the discs so that disc scratching by dry brushes is avoided. Next, the brushes which most recently left the discs are sprayed at position 52 to remove contaminants picked up by the brushes from the disc surfaces. These same brushes are again cleaned and rewetted at position 50 just before they enter the disc pack. Thus, each brush is cleaned and wetted twice during each brush assembly rotation before it reenters the disc pack. As is shown in FIG. 4, the angled configuration of the bristles 42 and the positioning of the spray bar 44 help clean contaminants from the brushes since the cleaning solution spray hits the bristles at an angle knocking the contaminants off of the non-porous bristles.

The total cleaning cycle in this embodiment of the invention lasts about 2 minutes and 45 seconds, as will be explained hereafter, and during this time the disc pack and spindle rotate about 800 RPM and the brush assembly and shaft rotate at about 3 RPM. Thus, each brush passes over a disc of the disc pack approximately 9 times during the cleaning cycle and every spot on each disc is cleaned an average of about 10 to 13 times with every pass of a bank of brushes through the disc pack for a total average of about 270 times during the entire cleaning cycle.

FLUID SYSTEM

Figure 6:
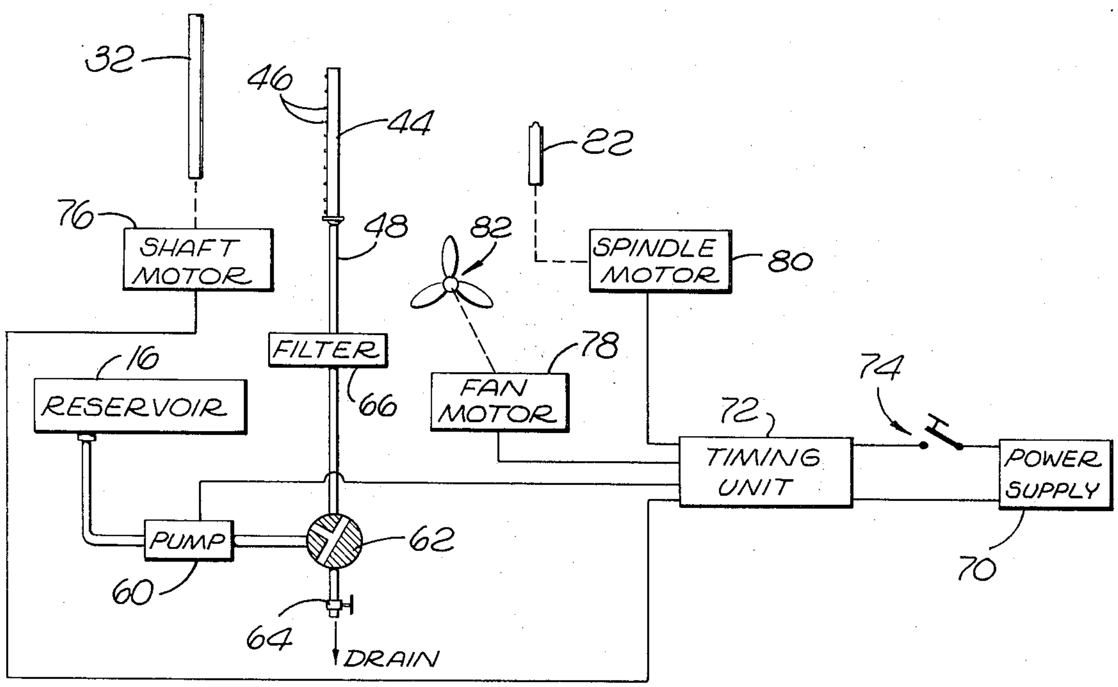
FIG. 6 is a schematic representation of various parts of the embodiment of the invention of FIGS. 1–5.

In the fluid system shown in FIG. 6, the sprayed cleaning solution collected by the reservoir 16 is conveyed to a pump 60 which pumps the solution through a three way valve 62 either out through a drain 64 or back through a filter 66 to be sprayed again through the spray bar 44, depending upon the setting of the valve 62. The filter 66 filters all cleaning solution before it enters the spray bar 44 so that the solution used to clean and rewet the brushes 38 is always clean and free of contaminants. The cleaning solution employed should be of a type adequate to clean grease and oil from the disc surfaces, such as a 91 percent alcohol solution or a non-residue detergent solution such as Randomex Cleaner No. 50281.

ELECTRICAL SYSTEM

As is shown in FIG. 6, the electrical system includes a power supply 70, such as a 115 volt, 60 hertz, 10 ampere power supply, connected to a timing unit 72. A switch 74 is provided to disconnect the timer and power supply whenever the housing door 20 is raised, such as when the disc pack is being changed. When the switch 74 is closed to begin a cleaning cycle, the timer 72 concurrently connects the pump 60, the shaft motor 76, the fan motor 78 and the spindle motor 80 to the power source 70. Thus, the brush assembly and the disc pack begin to rotate at the same time, the brushes are sprayed with cleaning solution before they contact the discs, and the fan 82 begins to circulate air to cool the pump and motors.

The timer allows the pump 60 and the brush assembly shaft motor 76 to operate for about 2 minutes and 45 seconds before the pump is shut off and the brush assembly stops rotating, thus ending the cleaning cycle. In order to dry the discs, the disc pack spindle motor continues to rotate the disc pack for about another one minute so that the residual cleaning fluid on the discs will spin off. The fan 82 blows warm air from the pump and motors through a circular aperture 90 (FIG. 2) in the partition wall 12 around the base of the disc pack spindle 22 so that warm air is drawn up and over the individual discs 26 of the disc pack by the rotation of the disc pack to aid in drying the discs. At the end of about the first 3 minutes and 45 seconds of the operation, the timer shuts off the spindle motor and the disc pack gradually slows to a stop during about the next 1 minute and 15 seconds to complete the drying cycle. The entire operation including cleaning and drying cycles thus takes a total of about 5 minutes at which time the timer shuts off the fan motor 78 and the cleaned disc pack may be removed.

Thus, an apparatus and method is provided in accordance with this invention which wets and cleans rotating brushes with a filtered cleaning solution before the brushes contact the disc surfaces. The brushes employed do not retain contaminants removed from the discs as do the porous pads of the prior art and therefore the brushes do not need to be constantly replaced. Furthermore, the discs are actually scrubbed by the biasing of the brush bristles against the disc surfaces. The apparatus of this invention is lightweight and portable, the entire apparatus weighing only about 105 pounds.

If disc packs having a different number of discs are to be cleaned, the brush assembly is merely replaced with another similar brush assembly having a compatible number of properly spaced brush arms.

It will be understood, of course, that the invention may be modified in many ways within the scope of the appended claims. In particular, it will be understood that the invention is not limited to the specific embodiment, dimensions, materials or configurations employed in describing the invention. Other types of components may be used and other types of surfaces cleaned in practicing the invention.

What we claim is:

1. An apparatus for cleaning recording surfaces comprising:

a cyclically moveable brush;

means for cyclically moving the brush across a recording surface during a portion of each cycle to contact and wipe the surface;

means for moving the recording surface with respect to the brush; and means for spraying a fluid against the brush to clean contaminants from the brush during a remaining portion of each cycle after movement across the surface.

2. A disc pack cleaner for cleaning contaminants from the recording surfaces of discs of a disc pack, comprising:

a brush assembly having a plurality of adjacent brush arms positioned in a plurality of planes, each of said adjacent brush arms being rotatable in a single one of said planes;

brushes secured to the end of each brush arm, a portion of the bristles of adjacent brushes being so towards each other between adjacent brush arms si that discs passing between adjacent brushes are wiped by the brushes; and means for spraying a fluid against the brushes.

3. A disc pack cleaner for cleaning contaminants from the recording surface of each disc of a disc pack, comprising:

a T-shaped brush assembly having a plurality of brush arms arranged in three banks, the brush arms of each bank being positioned one above the other, said three banks forming three arms in a generally T-shaped configuration;

a non-porous brush secured to the trailing edge of the end of each brush arm, a portion of the bristles of adjacent brushes in each bank being angled towards each other to form a "V" between adjacent brush arms so that the brushes bear against discs passing between adjacent brush arms;

a spray bar having a plurality of apertures for directing a spray of filtered cleaning solution against each brush, the spray bar being positioned so that spray is directed between each pair of brush arms and each brush is sprayed twice during each revolution of the brush assembly, once as the brush leaves the disc pack and once just before it contacts a disc;

a rotatable spindle for mounting the disc pack;

a rotatable shaft for mounting the brush assembly;

a motor adapted to rotate the spindle and the shaft in the same direction so that the brushes pass across the disc surfaces in a direction opposite to the rotation of the discs;

a reservoir for collecting the sprayed cleaning solution; and means for filtering the collected cleaning solution and supplying the filtered cleaning solution to the spray bar.

4. A disc pack cleaner as defined in claim 3 wherein the spray is directed against the bristles of adjacent brushes from between the legs of the "V," wherein the spindle and the shaft are arranged generally parallel to each other and at an angle of about 45° to the vertical, and wherein said filter and supply means comprises a filter and a pump.

5. A disc pack cleaner as defined in claim 2 further comprising:

means for rotating said disc pack in the same direction as the rotation of the brush assembly so that the brushes wipe across the disc recording surfaces in a direction opposite to the rotation of the discs during a portion of each rotation of the brush assembly, said brush assembly comprising at least one bank of brush arms adapted to be rotated to a position where all brushes and brush arms are displaced from the disc pack, and wherein said fluid spraying means directs spray between adjacent brush arms against the bristles of adjacent brushes to clean and wet the brushes during a portion of each rotation of the brush assembly.

6. A disc pack cleaner as defined in claim 5 wherein a portion of the bristles of adjacent brushes are angled each towards each other to form a "V" between adjacent brush arms so that the brushes bear against discs passing between adjacent brush arms, and wherein each brush is sprayed twice during each revolution of the brush assembly, once as the brush leaves the disc pack and once just before it contacts a disc.

7. A disc pack cleaner as defined in claim 3 wherein the three banks of brush arms are adapted to be rotated to a position where all brushes and brush arms are displaced from the position of the disc pack for unobstructed mounting of a disc pack on the spindle.

8. An apparatus for cleaning recording surfaces, comprising:

first support means;

second support means for mounting the recording surfaces adjacent to said first support means;

scrubbing means adapted to be mounted on said first support means whereby said scrubbing means is moved across at least one recording surface to contact and wipe said surface and is subsequently removed to a position spaced from said recording surface; and means positioned adjacent to said first support means adapted to spray fluid against the scrubbing means to clean contaminants from the scrubbing means at a position removed from said recording surface.

9. An apparatus for cleaning recording surfaces as defined in claim 8 wherein said first support means is rotatable and said scrubbing means comprises at least one brush adapted to bear against said recording surface and to retain a portion of said fluid after spraying.

* * * * *